United States Patent [19]

Kato et al.

[11] Patent Number: 5,656,072

[45] Date of Patent: Aug. 12, 1997

[54] INK COMPOSITION PROCESS FOR ITS PREPARATION AND INK-JET RECORDING PROCESS

[75] Inventors: Masahito Kato; Hideto Yamazaki, both of Nagoya, Japan

[73] Assignee: Brother Kogyo Kabushiki Kaisha, Nagoya, Japan

[21] Appl. No.: 677,928

[22] Filed: Jul. 10, 1996

[30] Foreign Application Priority Data

Jul. 17, 1995 [JP] Japan ................................. 7-180094
Aug. 9, 1995 [JP] Japan ................................. 7-203174

[51] Int. Cl.⁶ ............................................... C09D 11/02
[52] U.S. Cl. ............................. 106/31.58; 106/31.86; 347/100
[58] Field of Search ............................ 106/20 R, 20 D, 106/20 A, 22 B, 22 H

[56] References Cited

U.S. PATENT DOCUMENTS

| 3,946,398 | 3/1976 | Kyser et al. | 346/140 R |
| 4,373,954 | 2/1983 | Eida et al. | 106/20 D |

FOREIGN PATENT DOCUMENTS

| 53-12138 | 4/1978 | Japan . |
| 2-150355 | 6/1990 | Japan . |

Primary Examiner—Helene Klemanski
Attorney, Agent, or Firm—Oliff & Berridge

[57] ABSTRACT

An ink composition comprising a dye or pigment, dissolved or dispersed in an aqueous medium, and having acetates in a content less than 90 ppm or formates in a content less than 6 ppm.

12 Claims, No Drawings

INK COMPOSITION PROCESS FOR ITS PREPARATION AND INK-JET RECORDING PROCESS

BACKGROUND OF THE INVENTION

1. Field of the Invention

This invention relates to an ink composition suited for ink-jet recording, a process for its preparation, and an ink-jet recording process making use of the ink composition.

2. Description of the Related Art

Ink-jet recording is a system in which ink droplets are formed by ink ejection methods of various types (e.g., a system utilizing electrostatic attraction, a system in which mechanical vibration or displacement is imparted to ink by the use of a piezoelectric device, and a system in which ink is heated to cause it to bubble and a pressure produced when it bubbles is utilized), and part or the whole of them is caused to adhere to recording mediums such as paper to make a record.

As ink compositions used in such ink-jet recording systems, those prepared by dissolving or dispersing a water-soluble dye or a pigment in water or an aqueous medium comprising water and a water-soluble organic solvent are known and put into use. Such ink compositions are required to have various performances most suited for what they are used. For example, they are required to cause no precipitation or aggregation even when unused for a long period of time, to cause no clogging at nozzles and in ink channels of the head of an ink-jet printer and to ensure good print quality. In particular, the performance most required is the liquid stability that the ink composition does not cause clogging of, and deposits at, nozzles and ink channels of the ink-jet printer head when recording is performed using the ink composition and also when the recording is stopped over a long period of time. Among the ink-jet recording systems, the ink-jet recording system that utilizes heat energy tends to cause deposition of foreign matter on the surface of its heating element as a result of temperature changes, and the problem is especially important.

In conventional ink compositions, however, some additives are necessary to meet various conditions such as ink ejection conditions, long-term storage stability, sharpness and density of images at the time of recording, surface tension, electrical properties and so forth. Such additives, and also dyes used in the ink compositions, contain various impurities, and hence have brought about the problems such that they cause the clogging of nozzles and ink channels of the ink-jet printer head, and cause deposits during long-term storage.

SUMMARY OF THE INVENTION

Objects of the present invention are to solve the above problems to provide an ink composition having a superior stability, that may cause, even with a high dye concentration, no clogging of nozzles and ink channels in the heads of ink-jet printers or the like and especially may cause no formation of deposits on the heating elements of ink-jet printers utilizing heat energy; and to provide a process for its preparation, and an ink-jet recording process making use of the ink composition.

To achieve these objects, the present invention provides an ink composition comprising a dye or a pigment, dissolved or dispersed in an aqueous medium; the ink composition having acetates in a content less than 90 ppm or formates in a content less than 6 ppm.

The present invention also provides a process for preparing an ink composition comprising a dye or a pigment, dissolved or dispersed in an aqueous medium; the process comprising the steps of dissolving or dispersing the dye or pigment in the aqueous medium, and subjecting the resulting solution or dispersion to anion exchange so that the ink composition has acetates in a content less than 90 ppm or formates in a content less than 6 ppm.

The present invention also provides an ink-jet recording process carried out by jetting an ink composition to a recording medium in the form of droplets to make a record; the ink composition comprising a dye or a pigment, dissolved or dispersed in an aqueous medium, and having been controlled to have acetates in a content less than 90 ppm or formates in a content less than 6 ppm.

These and other objects, features and advantages of the present invention are described in or will become apparent from the following detailed description of the preferred embodiments.

DESCRIPTION OF THE PREFERRED EMBODIMENTS

The ink composition of the present invention is so controlled that the content of acetates is less than 90 ppm, or the content of formates, less than 6 ppm. This makes it possible to prevent nozzles and ink channels of the ink-jet printer head from clogging when the ink composition, even with a high dye concentration, is being used or is stored for a long term, and especially to prevent deposits from being formed on the heating element of the ink-jet printer that utilizes heat energy.

In the present invention, either the condition that the content of acetates is less than 90 ppm or the condition that the content of formates is less than 6 ppm may be fulfilled. It is preferable to fulfill both the conditions at the same time.

Basic components that make up the ink composition of the present invention will be described below.

As the basic components such as the dye or pigment and the aqueous medium that make up the ink composition of the present invention, those conventionally used in ink compositions for ink-jet recording may be used.

For example, the dye may include water-soluble dyes as typified by direct dyes, acid dyes, basic dyes and reactive dyes, any of which may be used. In particular, as those preferable for ink compositions used in the ink-jet recording systems and satisfying sharpness, water-solubility, stability, light-fastness and other required performances, the dye includes, for example, C.I. Direct Black 17, 19, 32, 51, 71, 108, 146; C.I. Direct Blue 6, 22, 25, 71, 86, 90, 106, 199; C.I. Direct Red 1, 4, 17, 28, 83; C.I. Direct Yellow 12, 24, 26, 86, 98, 142; C.I. Direct Orange 34, 39, 44, 46, 60; C.I. Direct Violet 47, 48; C.I. Direct Brown 109; C.I. Direct Green 59; C.I. Acid Black 2, 7, 24, 26, 31, 52, 63, 112, 118; C.I. Acid Blue 9, 22, 40, 59, 93, 102, 104, 117, 120, 167, 229, 234; C.I. Acid Red 1, 6, 32, 37, 51, 52, 80, 85, 87, 92, 94, 115, 180, 256, 315, 317; C.I. Acid Yellow 11, 17, 23, 25, 29, 42, 61, 71; C.I. Acid Orange 7, 19; C.I. Acid Violet 49; C.I. Basic Black 2; C.I. Basic Blue 1, 3, 5, 7, 9, 24, 25, 26, 28, 29; C.I. Basic Red 1, 2, 9, 12, 13, 14, 37; C.I. Basic Violet 7, 14, 27; and C.I. Food Black 1, 2.

The foregoing examples of the dye are particularly preferred for the water-based ink composition of the present invention. In the present invention, examples are by no means limited to these dyes.

In conventional ink compositions, such dyes are commonly used in such a proportion that the dye holds about 0.1 to 20% by weight in the ink composition. In the present invention, the dye may be used within such a range as a matter of course, and may also be used in an amount more than that conventionally applied. Even when used in such an amount, the ink composition can be stable and may cause no deposits. The ink composition may contain pigment in an amount of from 0.1% by weight to 20% by weight based on the total weight of the ink composition.

The aqueous medium used in the ink composition of the present invention is water, or a mixed solvent of water and a water-soluble organic solvent. Particularly preferably, it may be a mixed solvent of water and a water-soluble organic solvent. The water-soluble organic solvent includes those containing a polyhydric alcohol, having a ink-dry preventive effect. As the water, it is preferable to use not commonly available water containing various ions, but deionized water.

The water-soluble organic solvent used as its mixture with water may include, for example, lower alcohols such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol and hexylene glycol; lower alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; glycerol; 2pyrrolidone; N-methyl-2-pyrrolidone; and 1,3-dimethyl-2-imidazolidinone. Of these, glycerol, alkylene glycols such as diethylene glycol, and lower alkyl ethers of polyhydric alcohols such as triethylene glycol monoethyl ether are particularly preferred.

The water-soluble organic solvent may be contained in the ink composition in an amount of usually from 0 to 95% by weight, preferably from 10 to 80% by weight, and more preferably from 20 to 50% by weight, based on the total weight of the ink composition.

When this water-soluble organic solvent is used, the content of the water may be determined within a vast range, depending on the type of component of the water-soluble organic solvent, the composition thereof and the desired properties of ink, and may be within the range of usually from 10 to 95% by weight, preferably from 10 to 70% by weight, and more preferably from 20 to 70% by weight, based on the total weight of the ink composition.

The ink composition of the present invention is basically made up as described above. Besides, various conventionally known additives such as dispersants, surfactants, viscosity modifiers, surface tension modifiers, pH adjusters and antifungal agents may be optionally added. For example, viscosity modifiers such as polyvinyl alcohol, celluloses and water-soluble resins, surfactants of various types such as cationic, anionic and nonionic types, and pH adjusters such as diethanolamine and triethanolamine. When an ink composition is prepared which is used in an ink-jet recording process of the type a recording solution is charged, a specific resistance modifier including inorganic salts such as ammonium chloride is added. However, the use of acetates as any of these additives results in an increase in acetate ions, and hence must be avoided. Similarly, the use of formates results in an increase in formates ions, and hence must be avoided.

The process for preparing the ink composition of the present invention will be specifically described below.

First, sodium sulfate is added to an aqueous solution of the dye in a desired concentration to subject the dye to salting out. Next, the precipitate thus formed is collected by filtration, and this is washed with a saturated aqueous solution of sodium sulfate, followed by drying. The dried solid matter thus obtained is dissolved in a stated quantity in the water-soluble organic solvent, and thereafter the aqueous solution formed is filtered to obtain a filtrate. The water-soluble organic solvent used here may be any solvent so long as it is a bad solvent to sodium sulfate and also a good solvent to the dye. Any solvent may be selected as an optimum solvent taking account of the structure of the dye to be treated. Usually, alcohols, glycols, glycol ethers are preferable water-soluble organic solvents.

Next, to the filtrate obtained, a stated amount of water is added, followed by stirring, and then the solution obtained is passed through an anion-exchange resin. The solution having been subjected to anion exchange is subjected to appropriate pH adjustment. Thereafter, additives are optionally added thereto, followed by filtration to obtain the ink composition. Before it is provided as the ink composition, the content of acetates or formates in the ink composition is measured using an ion chromatographic measuring device to confirm whether the former is less than 90 ppm or the latter is less than 6 ppm.

In the procedure described above, the first treatment salting out is made in order to remove sodium chloride which is a typical impurity contained in a large quantity in commercially available dyes. The subsequent, treatment with the water-soluble organic solvent is made in order to remove both the sodium sulfate originally contained as an impurity in the dye and the sodium sulfate added in a large quantity in the above salting out. The treatment subsequently carried out using the anion-exchange resin is a method by which the acetate content or formate content in the ink composition is made lower as intended in the present invention, and is a treatment made in order to remove the acetates or formates.

In the foregoing, a typical method for controlling the acetates content or formates content in the ink composition is shown. Methods for such control are by no means limited to this method, and all methods can be effectively used so long as they are methods by which the acetates or formates can be removed.

As sources from which the acetates or formates or their salts come as impurities, the dye, the water and the additives such as surfactants and water-soluble resin are considered as the sources. As to the water, distilled water, ion-exchanged water or the like may be used as the water used for the ink composition, whereby the acetates or formates can be prevented from entering. As for the surfactants, those other than acetate types or formate types, e.g., nonionic surfactants, may be used, whereby the acetates or formates can be prevented from entering. With regard to the water-soluble resin, some water-soluble resins and so forth are those in which acetates or formates have entered when they are produced. Such resins and so forth may be treated by the same procedure as the above dye to remove acetates or formates, and thereafter may be used as the additives. The acetates or formates are often contained in a very large quantity in the dye and the water-soluble organic solvent. As the result, the acetates or formates are often contained into ink compositions.

In the foregoing, the removal of the acetates or formates contained in the ink composition has been chiefly described. In practice, together with the removal of acetates or formates, it is preferable to also remove iron, calcium, barium and so forth.

The ink composition of the present invention, obtained in the manner as described above, has well solved the problems involved in the prior art, and is for itself advantageous as having well balanced performances in respect of all of recording performances in ink-jet recording (e.g., signal response, stability in droplet formation, long-time continuous recording performance, and ink ejection stability after long-time pause), storage stability, fixing performance to recording mediums, recorded image light-fastness, water resistance and so forth. It can be useful as ink compositions for ink-jet recording of various systems, and can be preferable especially as an ink composition for the ink-jet recording system in which the ink composition is jetted in the form of droplets by utilizing the vibration of a piezoelectric device and also as an ink composition for the ink-jet recording system in which the ink composition is jetted in the form of droplets by utilizing the action of heat energy, the latter being easily affected by the formation of deposits. The present ink composition can also enjoy superior recording.

EXAMPLES

The present invention will be further described below by giving Examples and Comparative Examples. In the following description, "%" and "parts" are by weight unless particularly noted.

Example 1

An aqueous 5% solution of a commercially available dye DAIWA BLACK MSC (trade name; available from Daiwa Chemical Co., Ltd.) was prepared, and then sodium sulfate was added to the aqueous solution, followed by stirring to salt out the dye. The precipitate formed was collected by filtration, which was then washed with a saturated pure water solution of sodium sulfate, followed by drying. The dry solid matter obtained was weighed in a stated amount so as to be in a dye concentration of 3% in the resulting ink composition, and this was dissolved in a solution of 3:1 mixture of ethylene glycol and N-methyl-2-pyrrolidone. Next, the solution obtained was pressure filtered with a membrane filter of 1 μm in average pore diameter. To 40 parts of the filtrate thus obtained, 60 parts of water was added, and the mixture was passed through an anion-exchange resin AMBERITE IRA-410 (available from Organo Co., Ltd). Thereafter, the solution obtained was adjusted to have a pH of 8.5 using ethanolamine, and then filtered with a 0.7 μm membrane filter to obtain an ink composition. Acetate ion content in this ink composition was measured using an ion chromatographic measuring device to reveal that it was 80 ppm.

Using this ink composition, the following T1 to T3 were examined on an ink-jet printer having an on-demand type multi-head that performs recording by imparting heat energy to the ink in the recording head to produce ink droplets (ejection orifice diameter: 35 μm; heating resistor resistance value: 150 ohms; drive votage: 30 V; frequency: 2 kHz), to find that good results were obtained in all the cases as noted below together.

(T1) Long-term stability: The ink composition was hermetically enclosed in a heat-resistant glass bottle, and stored at −30° C. or 60° C. for 6 months. Even after such storage, deposition of insoluble matter was not seen, and changes in liquid properties and color tone were also little seen.

(T2) Ejection stability: The ink composition was continuously ejected in an atmosphere of 5° C., 20° C. or 40° C., for 24 hours for each. Always stable, high-quality recording was performed in all atmospheres.

(T3) Ejection response: Intermittent ejection at intervals of 1 minute and ejection after leaving for 2 months were examined. In both instances, no clogging occurred at the nozzles or ink channels of the ink-jet printer head, and stable and uniform recording was performed.

Comparative Example 1

An ink composition was prepared in the same manner as in Example 1 except that the solution was not passed through the anion-exchange resin. As a result, the acetate ion content in the ink composition was 125 ppm. Using this ink composition, its performances were examined in the same manner as in Example 1. As a result, in respect of T2, the ink often did not ejected. The surface of the heating element was observed using a microscope to confirm that deposits were seen to have adhered.

Example 2

An ink composition was prepared in the same manner as in Example 1, using as the dye a commercially available dye RABACELL FAST YELLOW R LIQUID (trade name; available from Bayer Japan Ltd.). As a result, the acetate ion content in the ink composition was 85 ppm. Using this ink composition, its performances were examined in the same manner as in Example 1. As a result, like Example 1, good results were obtained.

Comparative Example 2

An ink composition was prepared in the same manner as in Example 2 except that the solution was not passed through the anion-exchange resin. As a result, the acetates content in the ink composition was 130 ppm. Using this ink composition, its performances were examined in the same manner as in Example 1. As a result, in respect of T1, a small quantity of deposits were seen and the conductivity of the liquid decreased. In respect of T2, the ink often did not ejected. In respect of T3, clogging occurred at the nozzles of the ink-jet printer head when ejected after leaving for 2 months, making the ejection impossible. The surface of the heating element was observed using a microscope to confirm that a yellow substance was seen to have adhered.

Example 3

An ink composition was prepared in the same manner as in Example 1, using as the dye a commercially available dye CYRUS SUPRARED (trade name; available from Bayer Japan Ltd.). As a result, the acetates content in the ink composition was 75 ppm. Using this ink composition, its performances were examined in the same manner as in Example 1. As a result, like Example 1, good results were obtained.

Comparative Example 3

An ink composition was prepared in the same manner as in Example 3 except that the solution was not passed through the anion-exchange resin. As a result, the acetates content in the ink composition was 135 ppm. Using this ink composition, its performances were examined in the same manner as in Example 1. As a result, in respect of T1, the color tone changed after storage at −30° C., which changed in a difference of ΔE=5.0 in an L*a*b* color representation system when the color was measured in a visual field of 2 degrees using a D65 light source as prescribed by CIE.

Using this ink composition, printing was tested in the same manner as in Example 3. As a result, color tones of solid prints of 5 cm square changed at a difference of $\Delta E=7.5$, compared with the case when the ink composition was used before storage. This difference was clearly seen to look at.

Example 4

An ink composition was prepared in the same manner as in Example 1, using as the dye a commercially available dye RABACELL FAST YELLOW R LIQUID (trade name; available from Bayer Japan Ltd.). As a result, the acetates content in the ink composition was 85 ppm. Using this ink composition, its performances were examined in the same manner as in Example 1. As a result, like Example 1, good results were obtained.

Comparative Example 4

An ink composition was prepared in the same manner as in Example 4 except that the solution was not passed through the anion-exchange resin. As a result, the acetates content in the ink composition was 125 ppm. Using this ink composition, its performances were examined in the same manner as in Example 1. As a result, in respect of T3, clogging occurred at the nozzles of the ink-jet printer head when ejected after leaving for 2 months, making the ejection impossible. The surface of the heating element was observed using a microscope to confirm that deposits were seen to have adhered.

Example 5

Using the ink composition of Example 1 as black ink, the ink composition of Example 2 as yellow ink, the ink composition of Example 3 as magenta ink and the ink composition of Example 4 as cyan ink, full-color photographic images were reproduced on the same ink-jet recording apparatus as used in Examples 1 to 4. Images obtained were very sharp for each color and their colors were well reproduced.

Comparative Example 5

Using the ink composition of Comparative Example 1 as black ink, the ink composition of Comparative Example 2 as yellow ink, the ink composition of Comparative Example 3 as magenta ink and the ink composition of Comparative Example 4 as cyan ink, it was attempted to reproduce full-color photographic images in the same manner as in Example 5. As a result, many blank dots were seen and no sharp images were obtained. Color reproducibility was also poor.

In the ink compositions of Examples 1 to 5, which showed good long-term storage stability and ejection stability and also a good ejection response, the acetates content in the ink composition was less than 90 ppm in all the cases.

On the other hand, in the ink compositions of Comparative Examples 1 to 5, which caused problems in long-term storage stability, ejection stability and ejection response, the acetates content in the ink composition was not less than 90 ppm in all the cases.

As described above, in Examples 1 to 5, since the acetates content in the ink composition was less than 90 ppm, ink compositions having superior long-term storage stability, ejection stability and ejection response can be obtained.

In Examples 1 to 5 and Comparative Examples 1 to 5, the ink-jet recording head used was the on-demand type multi-head that performs recording by imparting heat energy to the ink in the recording head to produce ink droplets. Ink compositions having the above conditions were used also in ink-jet heads of the kaiser type disclosed in Japanese Patent Publication No. 53-12138 and the shear mode type disclosed in Japanese Patent Application Laid-open No. 2-150355 to examine ink performances in the same manner as in Examples 1 to 5. As a result, similar results were obtained.

Thus, according to the ink compositions of Examples 1 to 5, the acetates content in the ink composition is less than 90 ppm, and hence a good long-term storage stability required for inks can be achieved, and, in inkjet recording apparatus making use of such ink compositions, ink can be well jetted without causing the clogging of ink jet-out orifices and ink channels.

Example 6

An aqueous 5% solution of a commercially available dye DAIWA BLACK MSC (trade name; available from Daiwa Chemical Co., Ltd.) was prepared, and then sodium sulfate was added to the aqueous solution, followed by stirring to salt out the dye. The precipitate formed was collected by filtration, which was then washed with a saturated pure water solution of sodium sulfate, followed by drying. The dry solid matter obtained was weighed in a stated amount so as to be in a dye concentration of 3% in the resulting ink composition, and this was dissolved in a solution of 3:1 mixture of ethylene glycol and N-methyl-2-pyrrolidone. Next, the solution obtained was pressure filtered with a membrane filter of 1 µm in average pore diameter. To 40 parts of the filtrate thus obtained, 60 parts of water was added, and the mixture was passed through an anion-exchange resin AMBERITE IRA-410 (available from Organo Co., Ltd). Thereafter, the solution obtained was adjusted to have a pH of 8.5 using ethanolamine, and then filtered with a 0.7 µm membrane filter to obtain an ink composition. Formate ion content in this ink composition was measured using an ion chromatographic measuring device to reveal that it was 5.5 ppm.

Using this ink composition, like the case of Example 1, the following T1 to T3 were examined on an ink-jet printer having an on-demand type multi-head that performs recording by imparting heat energy to the ink in the recording head to produce ink droplets (ejection orifice diameter: 35 µm; heating resistor resistance value: 150 ohms; drive votage: 30 V; frequency: 2 kHz), to find that good results were obtained in all the cases as noted below together.

(T1) Long-term stability: The ink composition was hermetically enclosed in a heat-resistant glass bottle, and stored at −30° C. or 60° C. for 6 months. Even after such storage, deposition of insoluble matter was not seen, and changes in liquid properties and color tone were also little seen.

(T2) Ejection stability: The ink composition was continuously ejected in an atmosphere of 5° C., 20° C. or 40° C., for 24 hours for each. Always stable, high-quality recording was performed in all atmospheres.

(T3) Ejection response: Intermittent ejection at intervals of 1 minute and ejection after leaving for 2 months were examined. In both instances, no clogging occurred at the nozzles or ink channels of the ink-jet printer head, and stable and uniform recording was performed.

Comparative Example 6

An ink composition was prepared in the same manner as in Example 6 except that the solution was not passed through the anion-exchange resin. As a result, the formates content in the ink composition was 8.5 ppm. Using this ink composition, its performances were examined in the same manner as in Example 6. As a result, in respect of T2, the ink often did not ejected. The surface of the heating element was observed using a microscope to confirm that deposits were seen to have adhered.

Example 7

An ink composition was prepared in the same manner as in Example 6, using as the dye a commercially available dye RABACELL FAST YELLOW R LIQUID (trade name; available from Bayer Japan Ltd.). As a result, the formates content in the ink composition was 5 ppm. Using this ink composition, its performances were examined in the same manner as in Example 6. As a result, like Example 6, good results were obtained.

Comparative Example 7

An ink composition was prepared in the same manner as in Example 7 except that the solution was not passed through the anion-exchange resin. As a result, the formates content in the ink composition was 9.5 ppm. Using this ink composition, its performances were examined in the same manner as in Example 6. As a result, in respect of T1, a small quantity of deposits were seen and the conductivity of the liquid decreased. In respect of T2, the ink often did not ejected. In respect of T3, clogging occurred at the nozzles of the ink-jet printer head when ejected after leaving for 2 months, making the ejection impossible. The surface of the heating element was observed using a microscope to confirm that deposits were seen to have adhered.

Example 8

An ink composition was prepared in the same manner as in Example 6, using as the dye a commercially available dye CYRUS SUPRARED (trade name; available from Bayer Japan Ltd.). As a result, the formates content in the ink composition was 5.5 ppm. Using this ink composition, its performances were examined in the same manner as in Example 6. As a result, like Example 6, good results were obtained.

Comparative Example 8

An ink composition was prepared in the same manner as in Example 8 except that the solution was not passed through the anion-exchange resin. As a result, the formates content in the ink composition was 8.5 ppm. Using this ink composition, its performances were examined in the same manner as in Example 6. As a result, in respect of T1, the color tone changed after storage at −30° C., which changed in a difference of $\Delta E=5.0$ in an $L^*a^*b^*$ color representation system when the color was measured in a visual field of 2 degrees using a D65 light source as prescribed by CIE. Using this ink composition, printing was tested in the same manner as in Example 3. As a result, color tones of solid prints of 5 cm square changed at a difference of $\Delta E=7.5$, compared with the case when the ink composition was used before storage. This difference was clearly seen to look at.

Example 9

An ink composition was prepared in the same manner as in Example 6, using as the dye a commercially available dye RABACELL FAST YELLOW R LIQUID (trade name; available from Bayer Japan Ltd.). As a result, the formates content in the ink composition was 3.5 ppm. Using this ink composition, its performances were examined in the same manner as in Example 6. As a result, like Example 6, good results were obtained.

Comparative Example 9

An ink composition was prepared in the same manner as in Example 9 except that the solution was not passed through the anion-exchange resin. As a result, the formates content in the ink composition was 9.5 ppm. Using this ink composition, its performances were examined in the same manner as in Example 6. As a result, in respect of T3, clogging occurred at the nozzles of the ink-jet printer head when ejected after leaving for 2 months, making the ejection impossible. The surface of the heating element was observed using a microscope to confirm that deposits were seen to have adhered.

Example 10

Using the ink composition of Example 6 as black ink, the ink composition of Example 7 as yellow ink, the ink composition of Example 8 as magenta ink and the ink composition of Example 9 as cyan ink, full-color photographic images were reproduced on the same ink-jet recording apparatus as used in Examples 6 to 9. Images obtained were very sharp for each color and their colors were well reproduced.

Comparative Example 10

Using the ink composition of Comparative Example 6 as black ink, the ink composition of Comparative Example 7 as yellow ink, the ink composition of Comparative Example 8 as magenta ink and the ink composition of Comparative Example 9 as cyan ink, it was attempted to reproduce full-color photographic images in the same manner as in Example 10. As a result, many blank dots were seen and no sharp images were obtained. Color reproducibility was also poor.

In the ink compositions of Examples 6 to 10, which showed good long-term storage stability and ejection stability and also a good ejection response, the formates content in the ink composition was less than 6 ppm in all the cases.

On the other hand, in the ink compositions of Comparative Examples 6 to 10, which caused problems in long-term storage stability, ejection stability and ejection response, the formates content was not less than 6 ppm in all the cases.

As described above, in Examples 6 to 10, since the formates content in the ink composition was less than 6 ppm, ink compositions having superior long-term storage stability, ejection stability and ejection response can be obtained.

In Examples 6 to 10 and Comparative Examples 6 to 10, the ink-jet recording head used was the on-demand type multi-head that performs recording by imparting head energy to the ink in the recording head to produce ink droplets. Ink compositions having the above conditions were used also in ink-jet heads of the kaiser type disclosed in Japanese Patent Publication No. 53-12138 and the shear mode type disclosed in Japanese Patent Application Laid-open No. 2-150355 to examine ink performances in the same manner as in Examples 6 to 10. As a result, similar results were obtained.

Thus, according to the ink compositions of Examples 6 to 10, the formates content in the ink composition is less than 6 ppm, and hence a good long-term storage stability required for inks can be achieved, and, in ink-jet recording apparatus making use of such ink compositions, ink can be well jetted without causing the clogging of ink jet-out orifices and ink channels.

What is claimed is:

1. An ink composition comprising a dye or a pigment, dissolved or dispersed in an aqueous medium; said ink composition having at least one of i) acetates in a content less than 90 ppm and ii) formates in a content less than 6 ppm.

2. The ink composition according to claim 1, wherein said dye or pigment is contained in an amount of from 0.1% by weight to 20% by weight based on the total weight of the ink composition.

3. The ink composition according to claim 1, wherein said aqueous medium is a mixed solvent of water and a water-soluble organic solvent.

4. The ink composition according to claim 3, wherein said water is deionized water.

5. The ink composition according to claim 1, wherein said ink composition has acetates in a content less than 90 ppm and formates in a content less than 6 ppm.

6. The ink composition according to claim 5, wherein said dye or pigment is contained in an amount of from 0.1% by weight to 20% by weight based on the total weight of the ink composition.

7. The ink composition according to claim 5, wherein said aqueous medium is a mixed solvent of water and a water-soluble organic solvent.

8. The ink composition according to claim 7, wherein said water is deionized water.

9. A process for preparing an ink composition comprising a dye or a pigment, dissolved or dispersed in an aqueous medium; said process comprising the steps of:

dissolving or dispersing the dye or pigment in the aqueous medium; and subjecting the resulting solution or dispersion to anion exchange so that the ink composition has acetates in a content less than 90 ppm or formates in a content less than 6 ppm.

10. An ink-jet recording process comprising jetting an ink composition to a recording medium in the form of droplets to make a record; said ink composition comprising a dye or a pigment, dissolved or dispersed in an aqueous medium, and having been controlled to have acetates in a content less than 90 ppm or formates in a content less than 6 ppm.

11. The ink-jet recording process according to claim 10, wherein said ink composition is jetted in the form of droplets by utilizing the vibration of a piezoelectric device.

12. The ink-jet recording process according to claim 10, wherein said ink composition is jetted in the form of droplets by the action of heat energy.

* * * * *